United States Patent
Liu et al.

(10) Patent No.: US 10,388,314 B1
(45) Date of Patent: Aug. 20, 2019

(54) ADAPTIVE CONFIGURATION OF THERMAL ASPERITY GUARD BANDS

(71) Applicant: Seagate Technology LLC, Cupertino, CA (US)

(72) Inventors: Xiong Liu, Singapore (SG); Lan Xia, Singapore (SG); Quan Li, Singapore (SG); Lihong Zhang, Singapore (SG); Swee Chuan Samuel Gan, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/951,518

(22) Filed: Apr. 12, 2018

(51) Int. Cl.
G11B 5/09 (2006.01)
G11B 5/60 (2006.01)

(52) U.S. Cl.
CPC .................. *G11B 5/6029* (2013.01)

(58) Field of Classification Search
None
See application file for complete search history.

(56) References Cited

U.S. PATENT DOCUMENTS

| | | | | |
|---|---|---|---|---|
| 6,049,439 A * | 4/2000 | Ono | ............. | G11B 5/012 360/46 |
| 6,104,557 A | 8/2000 | Kasai et al. | | |
| 6,307,719 B1 * | 10/2001 | Mallary | ............. | G11B 5/4826 360/244.8 |
| 6,314,814 B1 * | 11/2001 | Brannon | ............. | G11B 5/58 73/705 |
| 6,483,657 B1 * | 11/2002 | Fioravanti | ............. | G11B 5/6005 360/25 |
| 6,754,015 B2 | 6/2004 | Erden et al. | | |
| 7,286,311 B1 | 10/2007 | Oberg et al. | | |
| 8,681,438 B1 | 3/2014 | Powers et al. | | |
| 8,687,313 B2 | 4/2014 | Selvaraj | | |
| 8,737,009 B2 | 5/2014 | Kunkel et al. | | |
| 8,773,802 B1 * | 7/2014 | Anderson | ............. | G11B 5/6076 360/55 |
| 8,879,188 B1 * | 11/2014 | Chia | ............. | G11B 5/6029 360/31 |
| 8,891,192 B1 * | 11/2014 | Dang | ............. | G11B 5/59627 360/234 |
| 8,902,533 B1 | 12/2014 | Barlow et al. | | |
| 9,129,633 B1 * | 9/2015 | Gan | ............. | G11B 5/6076 |
| 9,335,153 B2 | 5/2016 | Matousek et al. | | |
| 9,679,595 B1 | 6/2017 | Zhang et al. | | |

(Continued)

*Primary Examiner* — Peter Vincent Agustin
(74) *Attorney, Agent, or Firm* — Hall Estill Attorneys at Law

(57) ABSTRACT

Apparatus and method for reducing the effects of thermal asperities on a rotatable data recording surface. A data transducer writes user data to a first set of tracks at a first fly height above the recording surface. A compensation circuit detects a thermal asperity (TA) on the recording surface, and establishes a guard band as a second set of tracks that are co-radial with the TA. The second set of tracks are deallocated and removed from service. The compensation circuit further defines a reserve band as a third set of tracks immediately adjacent the guard band, and selects an increased, second fly height that allows the data transducer to write data to the reserve band without contacting the TA. The second set of tracks may have a greater track pitch than the first set of tracks to compensate for the greater fly height.

20 Claims, 6 Drawing Sheets

(56) References Cited

U.S. PATENT DOCUMENTS

| | | | | |
|---|---|---|---|---|
| 9,947,353 B1* | 4/2018 | Zhang | ............... | G11B 5/607 |
| 2003/0123191 A1* | 7/2003 | Kasamatsu | .......... | G11B 5/6005 |
| | | | | 360/235.8 |
| 2006/0203376 A1* | 9/2006 | Yoshioka | ............ | G11B 5/3136 |
| | | | | 360/75 |
| 2009/0213486 A1* | 8/2009 | Takahashi | .............. | G11B 5/455 |
| | | | | 360/75 |

* cited by examiner

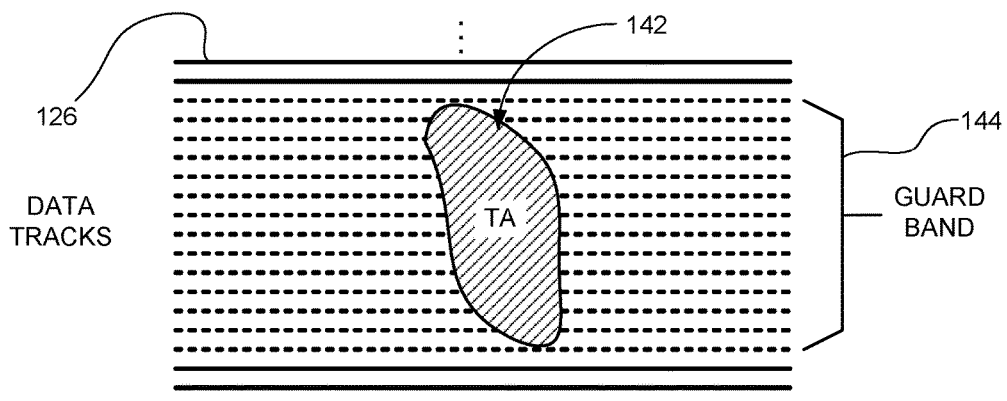
FIG. 3
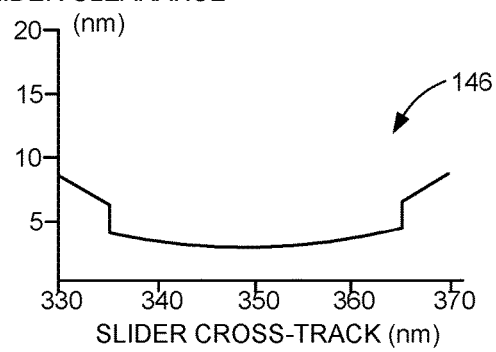
FIG. 4
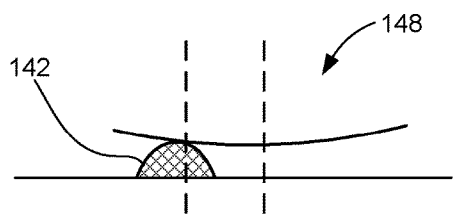
FIG. 5
| TA Height(A) | Extra GB(um) | Extra GB(Tracks) |
|---|---|---|
| 11.0 | 5 | 108 |
| 12.0 | 7 | 153 |
| 13.0 | 8 | 188 |
| 14.0 | 9 | 217 |
| 15.0 | 11 | 242 |
| 16.0 | 12 | 265 |
| 17.0 | 13 | 287 |
| 18.0 | 13 | 306 |
| 19.0 | 14 | 325 |
| 20.0 | 15 | 343 |
FIG. 6

ADAPTIVE CONFIGURATION OF THERMAL ASPERITY GUARD BANDS

SUMMARY

Various embodiments of the present disclosure are generally directed to reducing the effects of a thermal asperity on a rotatable data recording surface.

In some embodiments, an apparatus has a moveable data transducer adjacent a rotatable data recording surface. The transducer writes user data to a first set of tracks defined on the data recording surface at a first fly height from the data recording surface. A compensation circuit is configured to establish a guard band comprising a second set of unwritable tracks co-radial with a thermal asperity (TA) on the data recording surface. The compensation circuit is further configured to establish a second fly height for the data transducer to write data to a third set of tracks immediately adjacent the guard band, the second fly height being greater than the first fly height.

In other embodiments, a method includes using a moveable data transducer to detect a thermal asperity (TA) on a data recording surface as the data transducer is swept adjacent a first set of tracks at a first fly height from the data recording surface; establishing a guard band comprising a second set of tracks on the data recording surface that are co-radial with the TA, the second set of tracks deallocated from use in writing data by the data transducer; selecting a second fly height for the data transducer adjacent a third set of tracks immediately adjacent the TA, the second fly height greater than the first fly height; and writing data to the third set of tracks using the data transducer at the second fly height. These and other features and advantages of various embodiments can be understood from a review of the following detailed description in conjunction with the accompanying drawings.

BRIEF DESCRIPTION OF THE DRAWINGS

FIG. 3 is a top plan representation of a thermal asperity (TA) on the recording surface of FIG. 2.

FIG. 4 is a cross-track protrusion profile for the slider of FIG. 1 in some embodiments.

FIG. 5 schematically depicts a contact event between the slider of FIG. 4 and the TA of FIG. 3.

FIG. 6 is a table showing different guard band (GB) dimensions for different dimensions of TAs.

DETAILED DESCRIPTION

Figure 1:
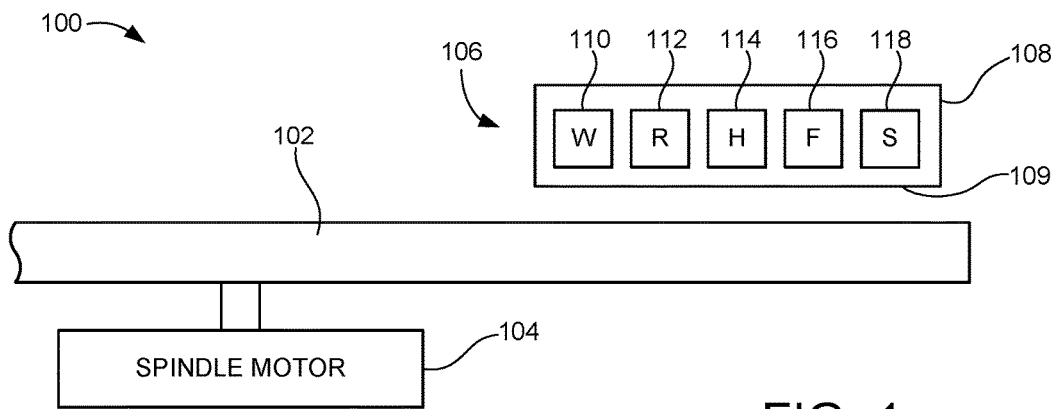
FIG. 1 shows a head/media combination of a data storage device constructed and operated in accordance with some embodiments.

The present disclosure is generally directed to data storage systems, and more particularly to reducing the effects of thermal asperities on the surfaces of rotatable data recording media.

Some data storage devices store data using rotating data recording media. One commonly form of rotatable media are magnetic recording discs which are accessed using a corresponding array of data read/write transducers (heads). The transducers are supported by adjacent data recording surfaces of the discs using sliders with air bearing surfaces (ABS). An ABS causes stable flight of the transducer in close proximity to the disc surface using fluidic currents of the surrounding atmosphere established by high speed rotation of the disc.

Write elements are supported by the sliders to magnetically write data in the form of alternating magnetic patterns to tracks defined on the disc surfaces. Read sensors are supported by the sliders to sense the magnetic patterns and recover the previously stored data. Other active and passive elements can be incorporated into the sliders such as a head assisted magnetic recording (HAMR) system, fly height adjustment mechanisms, contact sensors, etc.

Efforts are made to manufacture data storage devices with ever smaller slider clearance distances (fly heights) and greater numbers of tracks per linear distance (track densities). A current generation data storage device may have a typical transducer (head) fly height in the range of a few angstroms, Å ($10^{-10}$ m) or less and a typical track density of several hundred thousand tracks per inch (e.g., $10^5$ TPI) or more. The interior of a data storage device is strictly controlled in an effort to provide a clean and stable environment for the operation of the device.

Thermal asperities refer to a class of surface defects on rotatable recording medium. A thermal asperity (TA) may be characterized as an undesired feature that presents a localized change in the relative elevation of the media surface. This change in elevation is sufficient to alter the thermal equilibrium of the reader enough to induce significant noise (e.g., a drop in SNR) in the readback signal response.

A TA may be a latent defect present in a manufactured disc, or may be a "grown" defect that arises over time during field use by an end user. While some TAs may take the form of a localized depression, most TAs are exhibited as localized peaks that extend above the media surface. In many cases, a TA may have sufficient height to induce kinetic contact with the corresponding transducer, potentially inducing damage to the system.

It is common to periodically map each media surface in a data storage device to identify the radial locations of various TAs, after which the device establishes a guard band at each radial location. Depending on the size of the TA, a guard band may extend in a cross-track (radial) direction across several hundred tracks or more. The tracks in a guard band are "off limits" and deallocated from use in storing user data.

As head fly heights get lower, it is expected that more TAs will be detected, requiring the allocation of greater numbers of guard bands. This will tend to decrease overall data storage capacity and reduce signal integrity of the readback signal.

Various embodiments of the present disclosure are generally directed to an apparatus and method for mitigating against the effects of thermal asperities (TAs) by individually tailoring each guard band so as to be narrow as practical.

As explained below, an adaptive process is used in which the actual fly height and contours of each TA is measured. At the edges of each TA, the system will determine an increased fly height that can be used without the slider physically contacting the TA. A wider track width may be allowed in these locations to account for the higher fly height and maintain acceptable ADC levels in the readback signals obtained from the read sensors. In this way, each guard band can be bounded by one or more reserve bands of wider-than-normal tracks to provide reserve capacity, spare locations, etc.

In some embodiments, the process includes the following steps. A first step involves developing a first transfer function that relates track pitch and head clearance while meeting a specified bit error requirement. A second step involves developing a head cross-track protrusion profile to determine the width of the head, and build a second transfer function that relates head protrusion height (clearance) to guard band width. This essentially determines how closely the head can "snug" up next to a given TA. A third step scans the media to locate TAs and applies the two transfer functions to define a final guard band width and fly height profile for each TA. As noted above, each guard band can include a reserve band of wider tracks accessed at an increased fly height for use as a reserve area for data storage.

These and other features and advantages of various embodiments can be understood beginning with a review of FIG. 1 which provides aspects of a data storage device 100. The device 100 incorporates rotatable data storage media such as in the case of a hard disc drive (HDD) or a hybrid drive, although other forms of media can be used.

In the example of FIG. 1, one or more data recording media 102 in the form of magnetic recording discs are provided to store user data from a host device. The discs are axially aligned and rotated by a spindle motor 104 at a constant high speed. A thin layer of lubricant (not shown) may be applied to coat and protect each recording surface.

A data transducer 106 is controllably positioned adjacent the disc 102. The transducer 106, also referred to as a head, includes a slider 108 with an air bearing surface (ABS) 109 configured to support the slider 108 in close relation to the recording surface of the disc 102 using fluidic atmospheric currents established by high speed rotation of the discs.

The slider 108 supports a write element (W) 110 to write data to the disc 102 and a read sensor (R) 112 to subsequently read back the previously written data. Other elements can be supported by the slider 108 as well, including but not limited to a heat assisted magnetic recording (HAMR) system (H) 114, one or more fly height adjustment mechanisms (F) 116 and one or more contact sensors (S) 118.

Figure 2:
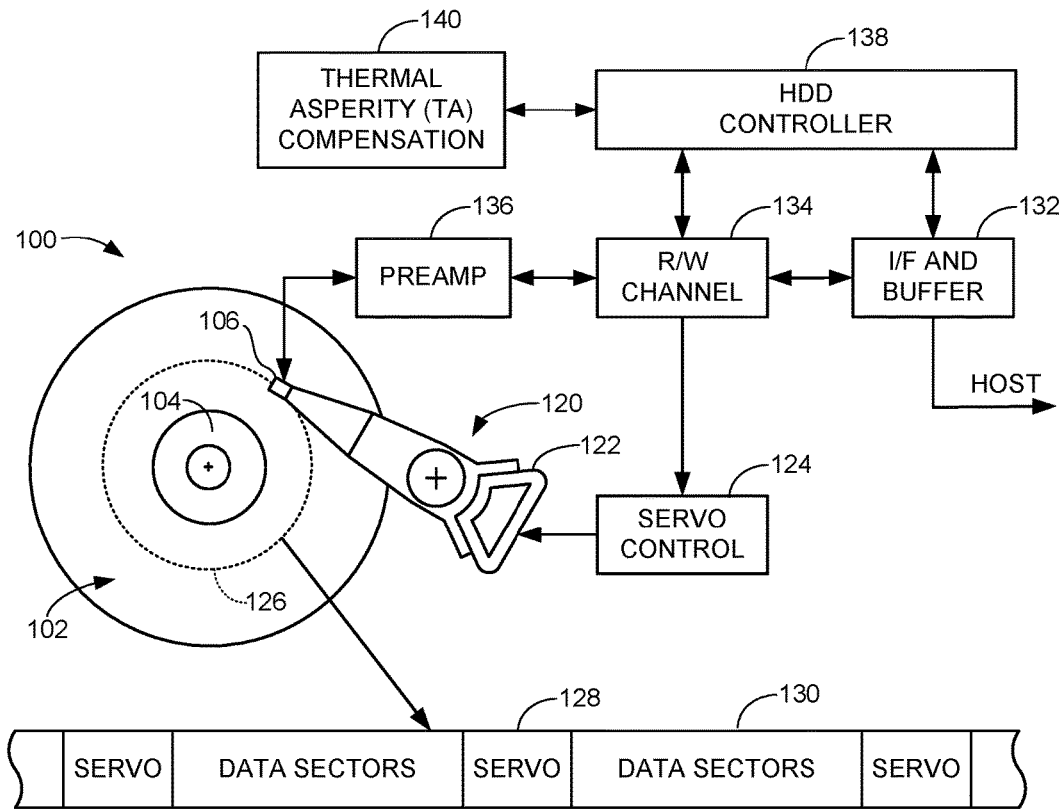
FIG. 2 is a functional block representation of aspects of the data storage device of FIG. 1.

FIG. 2 shows the storage device 100 of FIG. 1 in greater detail. The magnetic recording medium 102 is clamped to and rotated by the spindle motor 104 about a central axis. Multiple discs 102 may be axially mounted in a spaced apart relation to form a disc stack, with each disc providing opposing upper and lower recording surfaces. A corresponding transducer 106 may be supplied for the storage of user data to each surface.

A rotary actuator 120 is disposed adjacent an outermost peripheral edge of the disc 102 and pivots about a pivot point to radially move the transducers 106 across the respective data recording surfaces through application of current to a voice coil 122 of a voice coil motor by a servo control circuit 124. This operation aligns a particular transducer with a corresponding data track on the associated recording surface. One such track is denoted at 126.

An embedded servo configuration may be provided such that each track 126 includes spaced apart servo fields 128 with servo positioning data used by the servo control circuit 124 to maintain the respective active elements (e.g., write element 110, read sensor 112) over a selected track. User data are written to data sectors 130 disposed between adjacent servo fields 128 along each track. The system can adjust the location and widths of the various tracks as explained below.

A data channel between the transducers 108 and the external host device includes an interface (I/F) and buffer circuit 132, a read/write (R/W) channel 134 and a preamplifier/driver (preamp) circuit 136. A top level HDD controller circuit 138 controls the transfer of data between the host and the recording surfaces along the data channel. The controller 138 may incorporate a hardware processing circuit and/or one or more programmable processors that execute program instructions (e.g., firmware) stored in a local memory.

A thermal asperity (TA) compensation circuit 140 is further shown in FIG. 2. The TA compensation circuit 140 may form a portion of the controller functionality, or may be realized as one or more separate control circuits. The TA compensation circuit 140 operates to detect thermal asperities (TAs) on the respective surfaces of the media 102 and to adaptively select guard bands adjacent the TAs to protect the system from damage.

FIG. 3 shows an example thermal asperity (TA) 142 that spans multiple data tracks 126 on the media surface. It will be recognized that FIG. 3 is not drawn to scale. The TA 142 is a latent or grown defect that induces a thermal response (and in some cases, a kinetic response) when encountered by the transducer 106. A guard band 144 is established by the TA compensation circuit 140 to remove certain tracks co-radial with the TA 142 from use. The removed, or deallocated, tracks in the guard band 144 are represented by broken lines in FIG. 4.

The number of tracks in a given TA guard band (GB) such as 144 will generally be proportional to a cross-track protrusion profile of the slider. A wider protrusion profile is desirable to obtain lower reader temperatures during operation. In one example, a cross-track protrusion of about 30 um ($30 \times 10^{-6}$ m) may be used for the slider in FIG. 1, as illustrated by slider profile curve 146 in FIG. 4. FIG. 5 shows a contact point for the slider configuration of FIG. 4 against the TA of FIG. 3. It will be appreciated that the profiles of the transducer protrusion depicted in FIGS. 4-5 may change somewhat with changes in head skew as the transducer is moved to different radii across the media surface, depending on the slider construction.

A slider with about 30 um of protrusion would require a GB width of about 685 tracks given a track density of about 580 kTPI (580,000 tracks per inch). As HDD designs continue to use lower flight heights (FH) to achieve higher ADC resolution in the readback signals (e.g., lower SNR), it is expected that greater numbers of TAs will need to be detected and mapped out of the system. The GB padding for these TAs can constitute a significant subtractor in data capacity and ADC performance.

FIG. 6 provides a table of values illustrating estimated increases in GB size for greater TA heights (or corresponding reductions in fly heights). The additional GB sizes in the table are added to each side of the base size of about 685 tracks. It can be seen that lowering the effective clearance between a TA and a slider (either by providing a taller TA or a lower fly height) significantly increases the required width of a GB.

Figure 7:
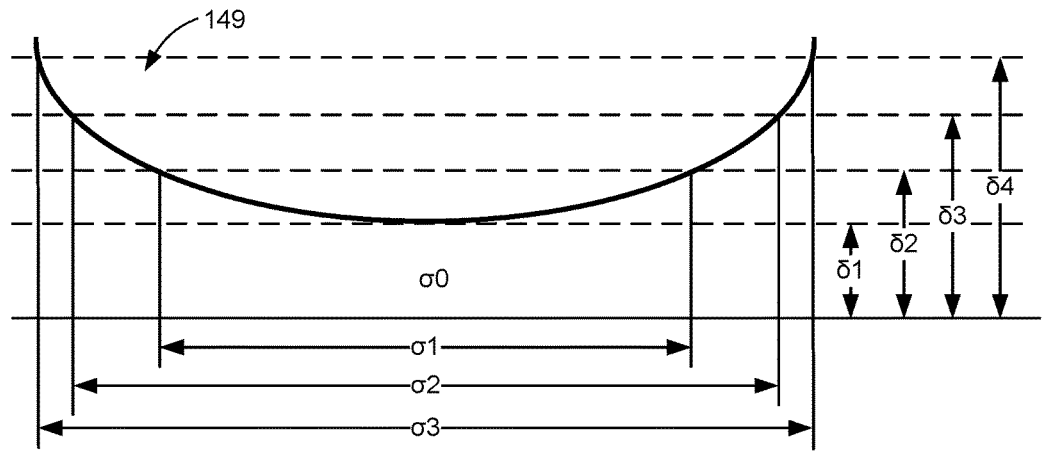
FIG. 7 shows a relationship of clearance distances to GB widths in some embodiments.

The general relationship between protrusion width and TA height/clearance is illustrated by curve 149 in FIG. 7. The Greek letter sigma (σ) is used to denote the width, in tracks, of each TA GB. The Greek letter delta (δ) is used to denote different fly heights/clearance levels for the slider.

The TA compensation circuit 140 operates to provide an increased head clearance (Clr) adjacent each TA area, so that the TA GB width can be reduced. Wider track pitch (TP) is applied adjacent the GB to compensate for degraded ADC and BER due to higher fly heights for both reads and writes. This is generally illustrated schematically in FIG. 8 which provides a cross-track view of the TA 142 from FIG. 3 in conjunction with the end view of a number of tracks (T) 126. It will be appreciated that FIG. 8 is not drawn to scale so that many hundreds of more tracks would likely be present in each of the denoted zones.

Figure 8:
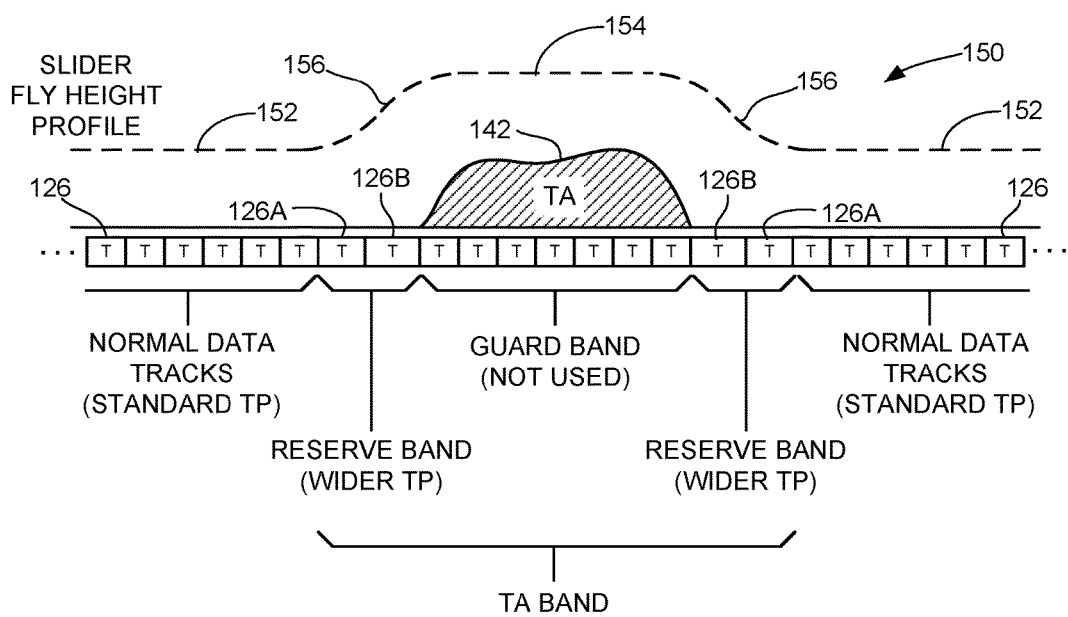
FIG. 8 is a cross-track depiction of a slider fly height profile generated and used in accordance with some embodiments.

Dotted line path 150 in FIG. 8 represents a slider fly height profile that is enacted when the slider 146 is brought into radial proximity with the TA 142. Segments 152 represent a normal fly height that is used over regions of normal data tracks 126. Segment 154 represents a maximum clearance height that may be applied to clear the TA 142, should the transducer 106 be flown over the guard band.

Segments 156 of path 152 are transitional zones in which one or more increased fly heights are applied when the slider 146 is flown adjacent the GB over a reserve band. Wider than normal tracks, such as 126A and 126B, are shown in each of the reserve bands. These wider tracks compensate for the increase in fly height. While a gradual transition is used, it will be appreciated that one or more stepwise transitions in fly height from elevation 154 to elevation 156 can be utilized so that all (or adjacent groups) of the wider tracks in the respective reserve bands have the same nominal width.

For reference, the term "guard band" is traditionally used to describe tracks to which data are not written based on the presence of a TA. This nomenclature is continued here. The term "reserve band" or "reserve bands" represent additional, wider tracks to which data may be written by having the slider "snug up" to the contours of the TA. The combined width of the guard band and reserve band(s) is referred to herein as a "TA band."

Figure 9:
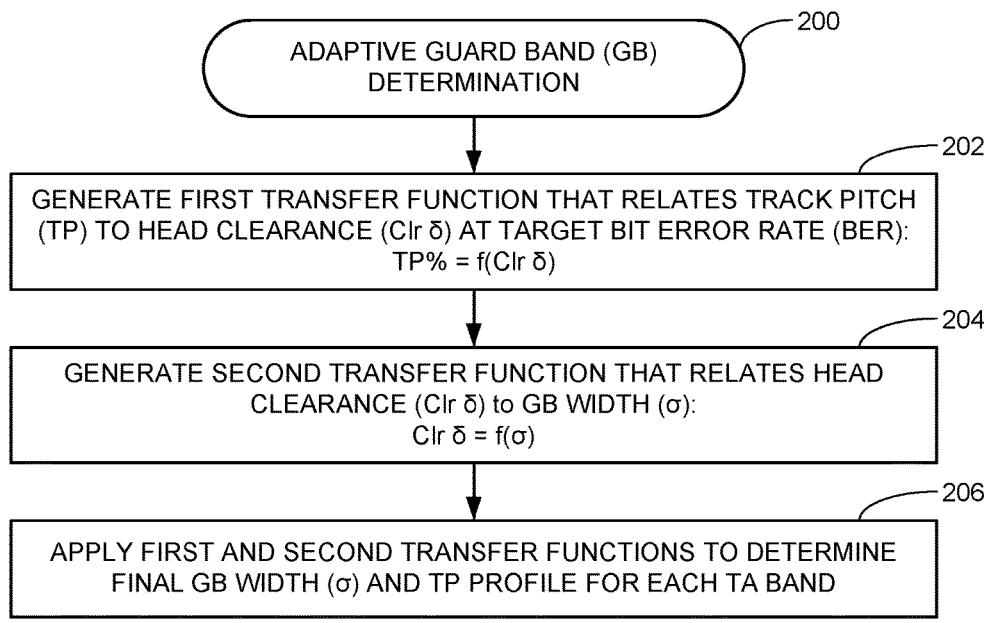
FIG. 9 is a flow chart for an adaptive guard band (GB) determination routine in accordance with some embodiments.

FIG. 9 provides a flow chart for an adaptive guard band (GB) determination routine 200. The routine 200 generally illustrates steps carried out by the TA compensation circuit 140 in some embodiments. Generally, the routine involves three (3) consecutive steps, each of which will be described more fully below.

The first step 202 involves generating a first transfer function that describes the relationship between track pitch (TP) and head clearance (or Heater DAC) in relation to a predefined, target BER requirement. The first transfer function may be expressed as:

$$TP\% = f(Clr\delta), \text{ at target } BER \tag{1}$$

In equation (1), TP % represents change in TP from nominal. Clr δ represents the associated fly height, and f(Clr δ) is the associated transfer function. It is contemplated this will be a second order function, although other formulations can be used. Curve fitting and other numerical techniques can be used to generate the first transfer function.

The second step 204 determines the head cross-track protrusion profile (such as in FIG. 4), and generates a second transfer function relating head protruding height (clearance) to GB width (σ), which may be expressed as a number of (nominal width) tracks. TA height, which for purposes herein is treated equal to Clr δ, is inversely proportional to the GB size as depicted in FIG. 7. The second transfer function may be expressed as:

$$Clr\delta = f(\sigma) \tag{2}$$

As before, the second transfer function generated during step 204 may be a second order function derived from curve fitting or other numerical techniques.

Finally, step 206 in FIG. 9 shows that once the first and second transfer functions have been obtained, a final GB width (σ) and TP profile is determined for each TA band.

Figure 10:
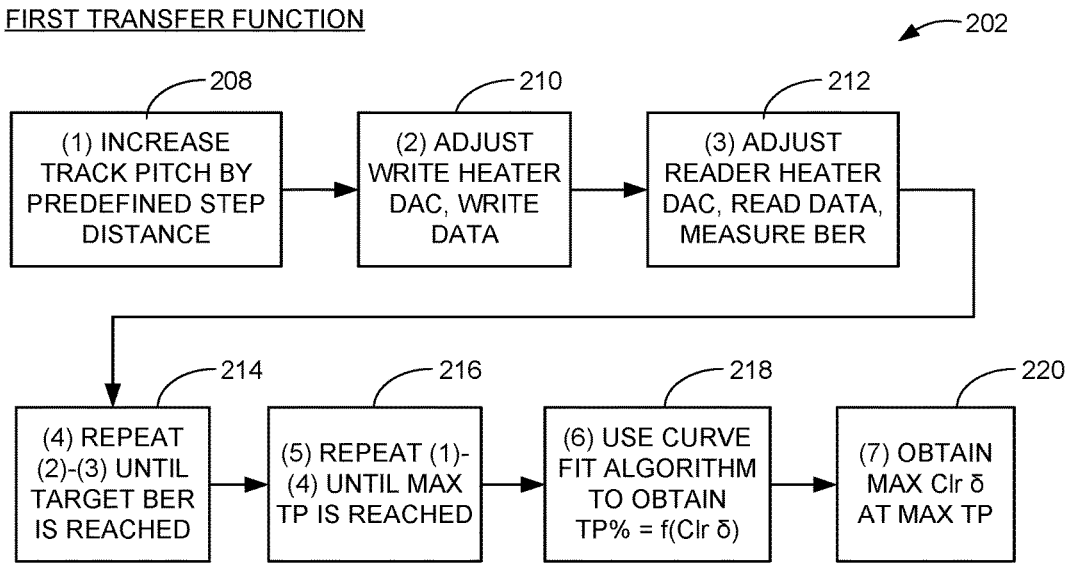
FIG. 10 illustrates a sequence to generate a first transfer function of the routine of FIG. 9.

FIG. 10 illustrates a flow sequence corresponding to step 202 in FIG. 9. It will be noted that the first transfer function is specific to a particular head-media combination and does not involve detecting or using an existing TA. A total of seven (7) steps are illustrated, although other methodologies may be used as required. These steps may be carried over an unused portion of the media surface to which data may be repetitively written and read.

For reference, it is contemplated albeit not necessarily required that the fly height adjustment elements (F) 116 in FIG. 1 comprise separate write heater and read heater elements that locally heat the slider to adjust the respective fly heights of the writer (W) 110 and reader (R) 112. These respective elements have DAC inputs, so that the applied power can be adjusted through using different heater DAC values during the sequence of FIG. 10.

The first step (1) at block 208 involves increasing the track pitch by a predefined step distance. In one example, the servo circuit 124 (FIG. 2) uses a 24 bit DAC adjustment, corresponding to a step increase of about 9.4% of the nominal track width (see the normal tracks 126 in FIG. 8).

The second step (2) at block 210 reduces the write heater DAC to achieve a desired fly height, after which data are written to the various data sector locations along one or more tracks (see FIG. 2).

The third step (3) at block 212 reduces the read heater DAC to equalize the writer clearance with the reader clearance (e.g., to nominally get the reader to the same adjusted fly height as in the second step). At this point, the written data are read by the reader a sufficient number of times to obtain a first measured bit error rate (BER). The BER can be expressed in any suitable format. Generally, a higher BER corresponds to a greater number of read errors for a total number of bits read. ECC circuitry can be turned off or adjusted to enable calculation of total errors, corrected errors, uncorrectable errors etc. as required.

The fourth step (4) at block 214 repeats steps (2) and (3) above for different fly heights until a target BER value is reached. It is contemplated albeit not necessarily required that the target BER is selected to correspond to a minimally acceptable BER during the reading of normal user data from the media.

The fifth step (5) at block 216 returns to step (1) where a new, larger track pitch (TP) is commanded and steps (2) and (3) are repeated until the target BER is reached for the second TP. This cycle is completed until a maximum allowable TP is reached. This may be some value limited by the effective writing width of the writer, or some allowable maximum percentage increase over the normal track width (such as 140% of normal).

The sixth step (6) at block 218 uses a curve fit algorithm or other suitable mechanism to generate the first transfer function (see equation (1) above). As desired, the seventh step (7) then obtains the maximum clearance that can be used at the maximum acceptable TP. At this point it will be noted that both track pitch (TP) and track width (TW) have been used interchangeably herein, which follows since it is contemplated that the tracks will be immediately adjacent. If there is space between tracks, then reference to TW should be understood as TP (distance between adjacent track centerlines).

Figure 11:
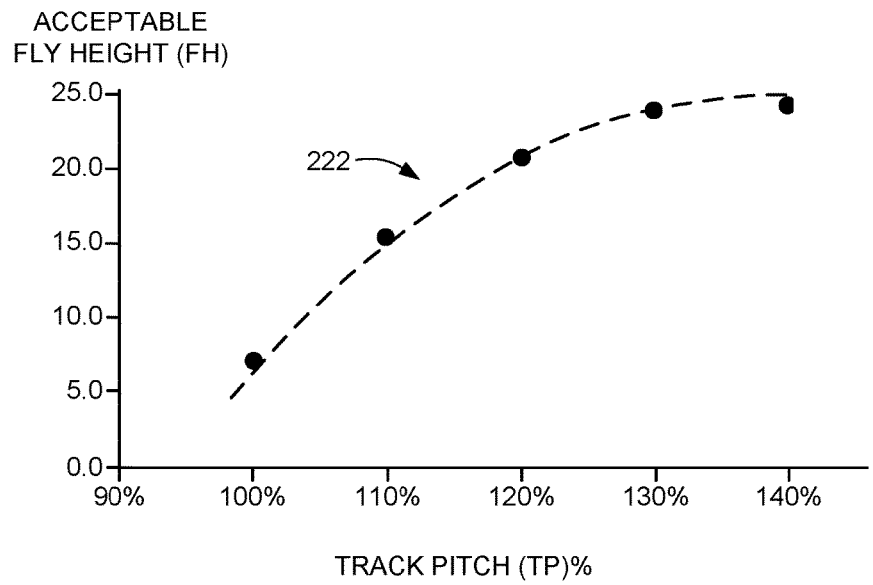
FIG. 11 graphically depicts various data points obtained during the sequence of FIG. 10 in some embodiments.

FIG. 11 shows a curve 222 used to nominally fit various data points obtained during the sequence of FIG. 10. The data points represent the maximum acceptable fly height that provided the target BER for various track pitch values of from about 100% to about 140%. The curve 222 can be used as the first transfer function to establish an appropriate fly height for a given track pitch.

Figure 12:
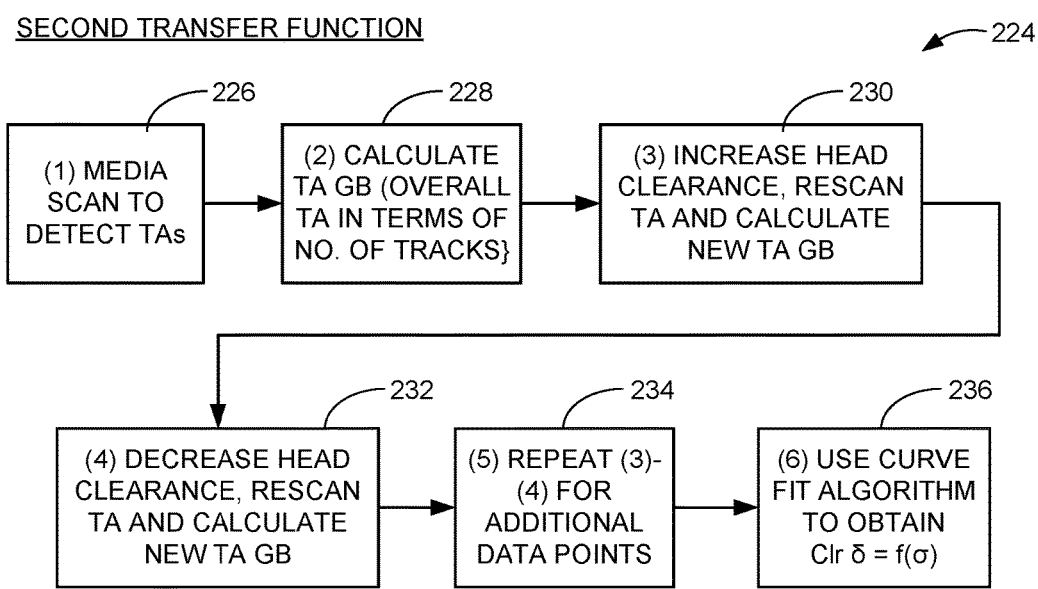
FIG. 12 illustrates a sequence to generate a second transfer function of the routine of FIG. 9.

FIG. 12 provides a sequence 224 to carry out step 204 in FIG. 9 to generate the second transfer function. The sequence 224 includes six (6) steps, although other methodologies may be used.

The first step (1) at block 226 involves scanning an associated media surface using a transducer to detect the presence of TAs. It is contemplated that the transducer 106 is swept in a selected radial direction such as from outermost diameter (OD) to innermost diameter (ID). When the first TA is encountered, the system logs the radial location and completes the scan. The scan may be carried out at the normal fly height (e.g., segments 152 in FIG. 8) or at some other value, such as 110% normal fly height, etc.

The second step (2) at block 228 involves calculating an overall base TA GB in terms of the number of tracks for the first TA. This can be carried out in a variety of ways. In one approach, the transducer is positioned on the OD side of the first TA and moved inwardly until contact is detected. The transducer is then positioned on the ID side and moved outwardly until contact is again detected (see e.g., FIG. 5). The radial distance between these opposing contact points can be converted to tracks to provide the base TA GB value.

The third step (3) at block 230 operates to increase the fly height by a selected amount and rescans the first TA as in step (2). This will provide a second, reduced TA GB value.

The fourth step (4) at block 232 reduces the head clearance and again rescans the first TA to provide a third TA GB. Because the head is flying lower, it is contemplated that this third TA GB will be greater than the base TA GB.

The fifth step (5) at block 234 repeats steps (3) and (4) as required to provide additional data points at different fly heights. The greater the number of fly heights, the more accurate determination can be made of the side contours of the TA.

The sixth step (6) at block 236 uses an appropriate curve fitting mechanism to obtain the second transfer function (see equation (2) above).

Figure 13:
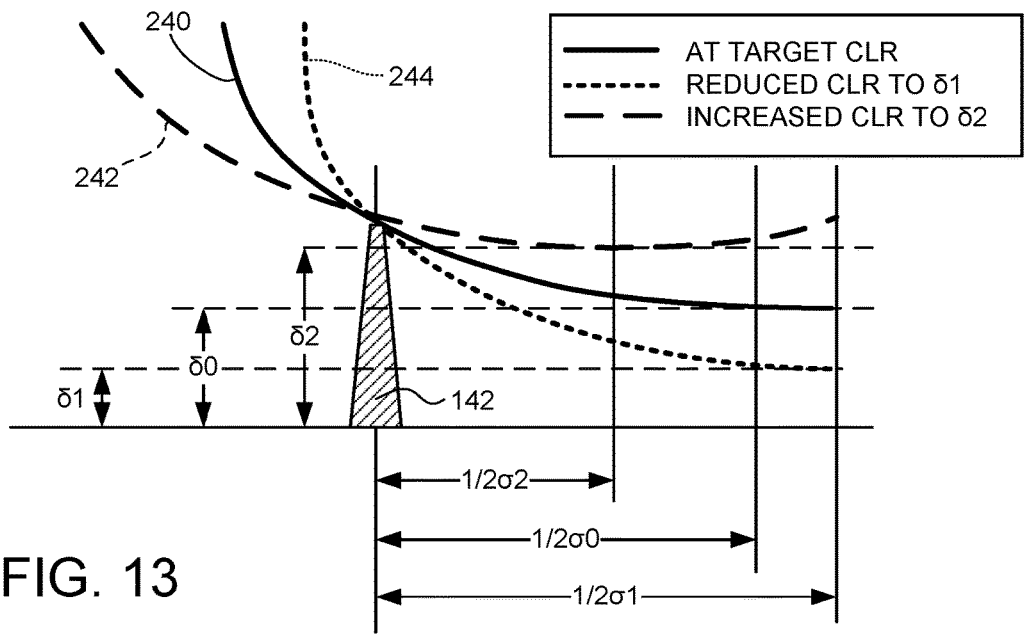
FIG. 13 graphically depicts various data points obtained during the sequence of FIG. 12 in some embodiments.

FIG. 13 illustrates results obtained from the sequence of FIG. 12. Solid curve 240 represents the slider at the initial fly height (Clr δ0). Dashed curve 242 provides the clearance at the increased fly height (Clr δ1), and dotted curve 244 provides the clearance at the decreased fly height (Clr δ2). As noted above, greater clearance values provide reduced TA GB values.

Figure 14:
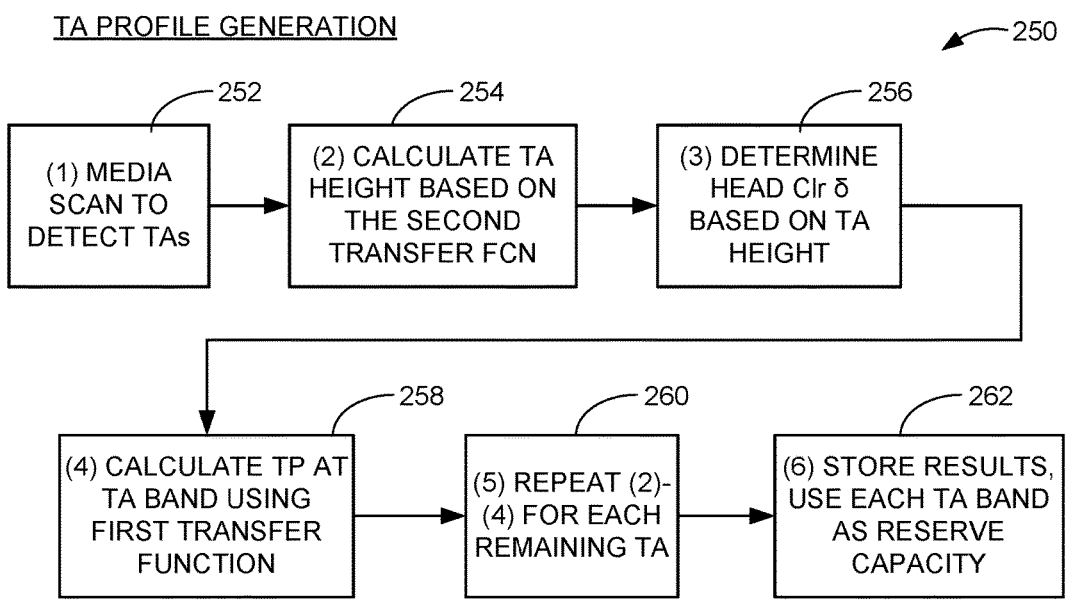
FIG. 14 illustrates a sequence that uses the first and second transfer functions to determine a suitable fly height for a reserve area of FIG. 8 in some embodiments.

FIG. 14 illustrates a sequence 250 that corresponds to step 206 in FIG. 9. The sequence 250 applies the two transfer functions to all of the TAs discovered on the media. It will be appreciated that the second transfer function is determined for a single TA. The use of the same (second) transfer function is based on the expectations that, generally, most of the TAs will have similar contour characteristics and therefore can be individually tailored using the sequence 250. However, it will be appreciated that additional transfer functions can be provided, including a different transfer function for each TA.

The sequence 250 in FIG. 14 involves six (6) steps, although other sequences can be used.

The first step (1) at block 252 performs a media scan as before to locate each of the TAs on the media surface. The location of each TA is logged to permit separate evaluation in turn.

The second step (2) at block 254 begins with the first detected TA and estimates the TA height using the second transfer function.

The third step (3) at block 256 determines the head clearance value (δmax) based on the TA height. Two different possibilities are contemplated depending upon whether the estimated TA height is less than, or greater than, the calculated maximum clearance at the maximum TP (see step 220, FIG. 10). These different possibilities are treated as follows:

If *TA* height<δmax, then *Clr*δ=*TA* height+1 (margin)   (3)

In this scenario, the height Clr δ is adjusted by one height adjustment interval to clear the TA. Otherwise, If *TA* height>δmax, then *Clr*δ=δmax   (4)

In this latter case, the final TA GB is determined by scanning the TA at the δmax clearance value.

The fourth step (4) at block 258 proceeds to calculate the TP in the reserve area(s) adjacent the guard band using the first transfer function. While it is contemplated that each TA will be supplied with two reserve areas on opposing sides of the guard band (as depicted in FIG. 8), this is not necessarily required. It is possible in some cases to provide the wider tracks just on a single side. This may be useful, for example, when shingled magnetic recording techniques are used so that writing tends to be carried out in a single radial direction to successive overlapping tracks.

The fifth step (5) at block 260 repeats the preceding steps (2) through (4) for each successive TA that was identified during the scan during step (1).

The sixth step (6) at block 262 stores the results for each TA. The results can vary depending on the requirements of a given application, but may include the identification of the width of the guard band (non-accessible) tracks, the number of wider tracks in the reserve band(s) and the associated fly heights, and the overall width (in terms of normal tracks) of the entire TA area. Other data may be stored as well including various measurements obtained during the routine. This may be useful, for example, during subsequent scans to detect changes (including the rate at which defects continue to grow, etc.). As required, the available storage space in the reserve bands can be used as required as reserve capacity, the use of spare sectors, the storage of control data, etc.

It will now be appreciated that the various embodiments discussed herein can provide a number of benefits. Guard bands can be reduced by flying the heads higher as the heads radially approach the TAs. Matching the transducer protrusion profile and the side contours of the TAs allows the heads to fly closer to the TAs, thus reducing the required GB width.

It is contemplated that wider tracks will be used at the higher fly heights to help maintain target BER performance in the reserve areas adjacent the TAs. However, this is not necessarily required as other mechanisms can be used to maintain the desired ADC, SNR and BER values, such as the use of different (stronger) ECC, the use of outer codes, etc. Moreover, while it is contemplated that the tracks adjacent the guard bands at which the transducer flies higher are separate bands used for reserve storage, such can also be used for normal data allocation.

When SMR techniques are used, the data TP can be widened to compensate for the BER loss since SMR writer widths tend to be much wider than the slim track pitch and will tend to have a much higher TP capability. When CMR techniques are used, the BER loss at higher FH may be compensated by widening TP and reducing BPI, or through other means.

In still further embodiments, both transfer functions can be developed and stored during factory testing procedures carried out during device manufacturing. Separate transfer functions can be generated for different radially extending zones. The transfer functions can further be generated and used during field use, such as during an idle mode of operation during which no pending host data access (e.g., read or write) commands are pending. The fixed transfer functions for a given design can further be used to reduce analysis time at a tolerable accuracy tradeoff.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising:
a moveable data transducer adjacent a rotatable data recording surface configured to write user data to a first set of tracks defined on the data recording surface at a first fly height from the data recording surface, each of the first set of tracks having a first track pitch; and
a compensation circuit configured to establish a guard band comprising a second set of unwritable tracks co-radial with a thermal asperity (TA) on the data recording surface, the compensation circuit further configured to establish a second fly height for the data transducer to write data to a third set of tracks immediately adjacent the guard band, the second fly height greater than the first fly height and each of the third set of tracks having a second track pitch greater than the first track pitch.

2. The apparatus of claim 1, wherein the second fly height is established responsive to a protrusion profile of the data transducer and an estimated elevational height of the TA.

3. The apparatus of claim 1, wherein the compensation circuit is further configured to scan the data recording surface by radially advancing the data transducer between an outermost diameter (OD) and an innermost diameter (ID) of the data recording surface to detect the TA.

4. The apparatus of claim 1, further comprising a controller circuit which directs storage, by the data transducer, of user data in data sectors in the first set of tracks and which allocates the third set of tracks as reserve capacity once the first set of tracks have been filled.

5. The apparatus of claim 1, wherein the compensation circuit is configured to generate a first transfer function that relates track pitch to fly height of the data transducer at a specified bit error rate (BER), a second transfer function that relates the fly height to a cross-track protrusion profile of the data transducer, and uses the first and second transfer functions to select the width of the guard band and the second fly height for the data transducer.

6. The apparatus of claim 5, wherein the compensation circuit generates the first transfer function by establishing an associated fly height for each of a different number of track pitch values that nominally provides a target BER value.

7. The apparatus of claim 5, wherein the compensation circuit generates the second transfer function by contactingly engaging opposing sides of the TA using the data transducer at different respective fly heights of the data transducer.

8. The apparatus of claim 1, further comprising a memory which stores the fly height and radial locations of the second and third sets of tracks, and a control circuit which directs the data transducer to fly adjacent the third set of tracks at the second fly height to write data to the third set of tracks.

9. The apparatus of claim 1, characterized as a data storage device connectable to a host device to store and retrieve data to and from the first set of tracks responsive to host access commands from the host device, the data storage device comprising a control circuit configured to detect an idle condition during which no host access commands are pending and to direct the compensation circuit to detect the TA and determine the second fly height during the idle condition.

10. A method comprising:
using a moveable data transducer to detect a thermal asperity (TA) on a data recording surface as the data transducer is swept adjacent a first set of tracks at a first fly height from the data recording surface;
establishing a guard band comprising a second set of tracks on the data recording surface that are co-radial with the TA, the second set of tracks deallocated from use in writing data by the data transducer;
selecting a second fly height for the data transducer adjacent a third set of tracks immediately adjacent the TA, the second fly height greater than the first fly height; and
writing data to the third set of tracks using the data transducer at the second fly height to avoid contact between the TA and the data transducer, wherein flying the data transducer adjacent the third set of tracks at the first fly height results in contact between the TA and the data transducer.

11. The method of claim 10, wherein the second fly height is established responsive to a protrusion profile of the data transducer and an estimated elevational height of the TA.

12. The method of claim 10, wherein each of the first set of tracks has a first track pitch and each of the third set of tracks has a second track pitch greater than the first track pitch so that each of the second set of tracks is wider than each of the first set of tracks.

13. The method of claim 10, further comprising scanning the data recording surface by radially advancing the data transducer between an outermost diameter (OD) and an innermost diameter (ID) of the data recording surface to detect the TA.

14. The method of claim 10, further comprising generating a first transfer function that relates track pitch to fly height of the data transducer at a specified bit error rate (BER), and establishing the second fly height responsive to the first transfer function.

15. The method of claim 14, further comprising generating a second transfer function that relates the fly height to a cross-track protrusion profile of the data transducer, and further using the second transfer function to select the width of the guard band and the second fly height for the data transducer.

16. The method of claim 14, wherein the first transfer function is generated by establishing an associated fly height for each of a different number of track pitch values that nominally provides a target BER value.

17. The method of claim 10, further comprising storing the second tly height and radial locations of the second and third sets of tracks in a memory, and retrieving the second fly height and the radial locations of the second and third sets of tracks from the memory to write the data to the third set of data tracks.

18. The method of claim 10, further comprising an idle condition in which no host access commands are pending to transfer data between a host device and the data recording surface, and determining the second fly height during the idle condition.

19. An apparatus comprising:
a moveable data transducer adjacent a rotatable data recording surface configured to write user data to a first set of tracks defined on the data recording surface;
a compensation circuit configured to establish a first fly height for the data transducer over the first set of tracks, a higher second fly height for the data transducer over a second set of tracks co-radial with a thermal asperity (TA) on the data recording surface, and an intermediate third fly height for the data transducer over a third set of tracks between the first and third sets of tracks, the intermediate third fly height between the first and second fly heights; and
a control circuit configured to direct a writing of first data to the first set of tracks at the first fly height and to direct a writing of second data to the third set of tracks at the second fly height.

20. The apparatus of claim 19, wherein the first set of tracks have a first track pitch and the third set of tracks have a second track pitch greater than the first track pitch.

* * * * *

UNITED STATES PATENT AND TRADEMARK OFFICE
CERTIFICATE OF CORRECTION

PATENT NO. : 10,388,314 B1
APPLICATION NO. : 15/951518
DATED : August 20, 2019
INVENTOR(S) : Xiong Liu et al.

Page 1 of 1

It is certified that error appears in the above-identified patent and that said Letters Patent is hereby corrected as shown below:

In the Claims

In Column 11, Line 6:
"the second tly height" should be "the second fly height"

Signed and Sealed this
Eighth Day of October, 2019

Andrei Iancu
*Director of the United States Patent and Trademark Office*